United States Patent [19]
Gould et al.
[11] 3,824,336
[45] July 16, 1974

[54] EDITING SYSTEM AND METHOD

[75] Inventors: George K. Gould, Roslyn; Armando Belmares Sarabia, Long Beach, both of N.Y.

[73] Assignee: Teletronics International, Inc., New York, N.Y.

[22] Filed: Mar. 17, 1972

[21] Appl. No.: 235,507

[52] U.S. Cl. .............. 178/6.8, 178/5.2 A, 178/7.85, 178/7.92, 355/52, 355/53, 360/3, 360/14
[51] Int. Cl. ..... G02b 15/00, H04n 5/78, H04n 7/18
[58] Field of Search ......... 178/5.2 A, 6.8, 7.85, 7.9, 178/7.92, DIG. 6, 7.5 SE; 352/53

[56] References Cited

UNITED STATES PATENTS

| | | | |
|---|---|---|---|
| 2,098,390 | 11/1937 | Iams | 178/7.5 SE |
| 2,420,197 | 5/1947 | Rosenthal | 178/7.5 SE |
| 3,265,946 | 8/1966 | Johnson | 318/18 |
| 3,488,861 | 1/1970 | Jones | 35/11 |
| 3,490,844 | 1/1970 | Sapp | 352/53 |
| 3,490,845 | 1/1970 | Gordon | 355/52 |
| 3,603,726 | 9/1971 | Garber | 178/7.92 |
| 3,610,815 | 10/1971 | Gould | 178/5.2 A |
| 3,737,877 | 6/1973 | Feinleib | 340/173 LT |

*Primary Examiner*—Howard W. Britton
*Attorney, Agent, or Firm*—Curtis, Morris & Safford

[57] ABSTRACT

Images on motion picture film are converted into electrical video signals by means of a motion picture projector and a film camera. The video pictures are displayed sequentially on a video receiver screen. The film is stopped so that a selected frame is displayed on the screen. The stationary image on the screen then is enlarged as much as necessary by means of either a zoom lens to replace the usual projection lens in the motion picture projector, or by electronic "underscanning" of the image. Means also are provided for moving the image both in the horizontal and vertical directions so as to position certain objects in a more desirable location, or, in some cases, to move certain objects or elements of the image out of the outline of the screen, thus effectively editing them out of the film. Then, the modified video signals are recorded on video tape. Portions of the tape which have had editing work performed on them then are spliced together with other portions of tape to form the finished, edited video tape. The editing can be combined with electronic color correction. As another alternative, two motion picture projectors can be used instead of one, with means for storing the enlargement and other editing information, and then the projectors can be operated alternatingly to produce a continuous video tape without splicing. As a further alternative, a single projection can be used together with two zoom enlargement systems and appropriate shutters, with the zoom systems being operated alternatively, in order to produce a continuous video tape.

18 Claims, 9 Drawing Figures

NORMAL SCENE

SCENE ENLARGED

SCENE MOVED LEFT AND DOWN

EDITING SYSTEM AND METHOD

This invention relates to apparatus and methods for converting motion picture film to video tape, and particularly to apparatus and methods for editing the images recorded on the video tape.

It is an object of the present invention to provide a system and method for film-to-tape transfers in which it is possible to enlarge, reduce, and shift images which will appear on the video tape. Furthermore, it is an object of the invention to provide such an apparatus and method which do not significantly distort the images, and which are relatively simple to use.

In accordance with one aspect of the invention, the foregoing objects are satisfied by the provision of an editing system and method in which electrical image signals representative of the video components of images stored on a record medium such as motion picture film are combined and displayed within a video receiver screen outline. Means are provided for enlarging the displayed images and for moving the displayed images in different directions so as to shift the images in two different directions within the outline. Preferably, movement of the image in the horizontal or vertical direction is accompanied by enlargement of the image so that blank areas will not show at the edges of the image when it is moved in either the horizontal or vertical direction. In another aspect, the invention meets the foregoing objects by providing a system for film-to-tape transfers in which a zoom lens replaces the usual projection lens. The foregoing and other objects, advantages and features of the invention will be disclosed in or apparent from the following description and drawings.

In the drawings:

FIG. 1 is a partially perspective and partially schematic view of one embodiment of the present invention;

Each of FIGS. 2, 3 and 4 illustrates the use of the method of the present invention;

Figures 1, 9:
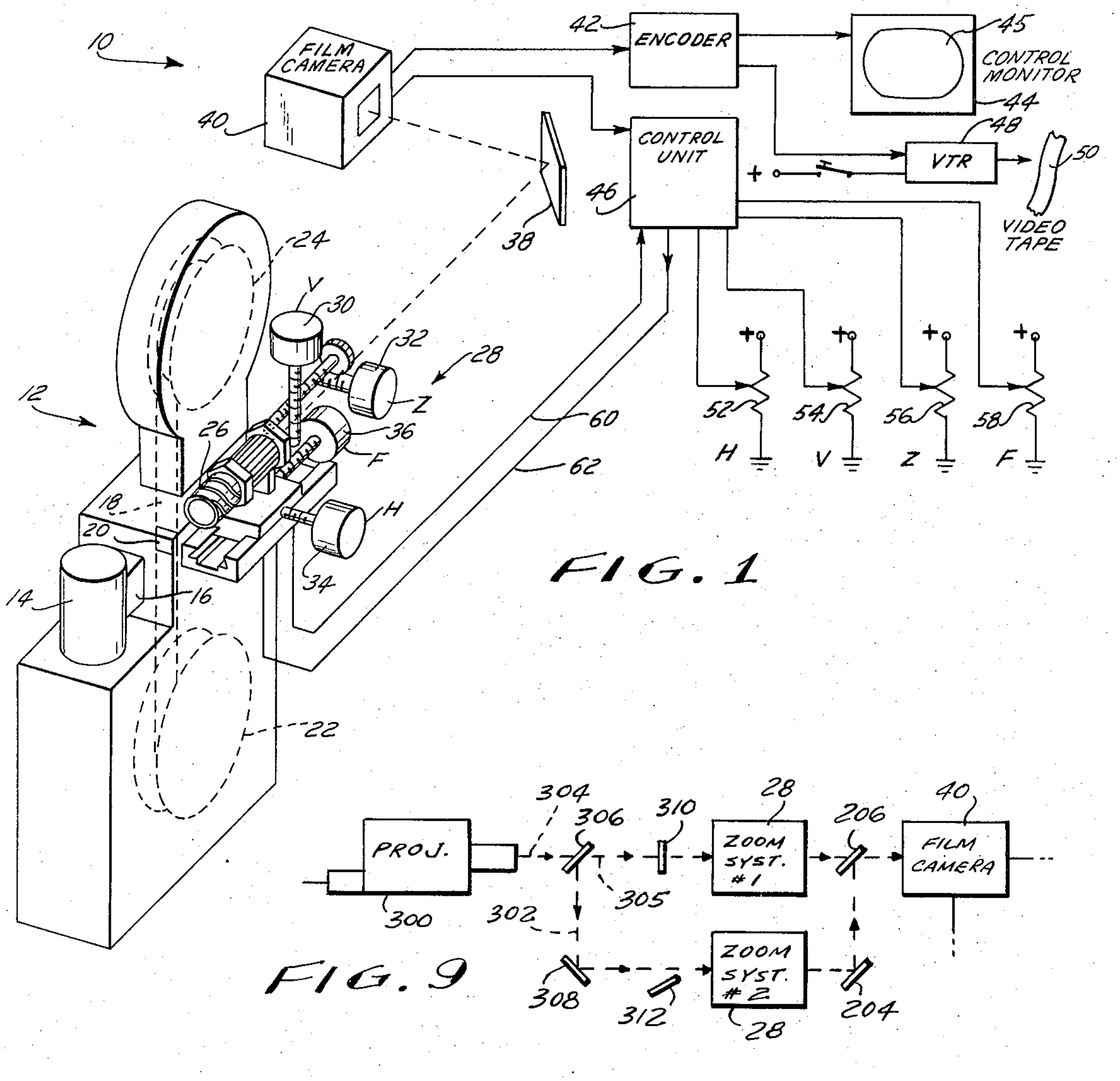
FIGS. 8 and 9 are schematic diagrams of further embodiments of the invention.

FIG. 1 illustrates a film-to-tape transfer system 10 constructed in accordance with the present invention. The system includes a motion picture projector in which a zoom lens 26 replaces the usual projection lens, together with a drive system 28 for adjusting the zoom lens 26. The zoom lens 26 and the drive system 28 make it possible to enlarge and reduce the motion picture images transmitted through the zoom lens, and to shift the image both horizontally and vertically.

The images from the zoom lens 26 are transmitted to a 45° reflecting mirror 38 which reflects them into a conventional film camera 40 which converts the optical images into red, green, blue and white video component signals. These signals are delivered to a conventional encoder 42 which encodes and combines the color component signals so that they can be displayed on a control monitor 44, which is a conventional television receiver. A control unit 46 is provided. The control unit 46 includes known equipment for stopping and starting the projector, for adjusting the color components of the video picture, and for controlling the degree of enlargement and/or horizontal and vertical movement of the images within the screen area 45 of the monitor. A video tape recorder 48 is provided to record the modified images on video tape 50. Servomotor position signals are delivered over a group of leads 60 from the drive unit 28 to the control unit 46. Control signals for the unit 28 are delivered over a group of leads 62 from the control unit 46 to the drive unit 28.

Figure 2:
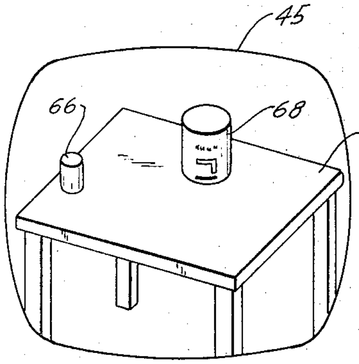
Figure 3:
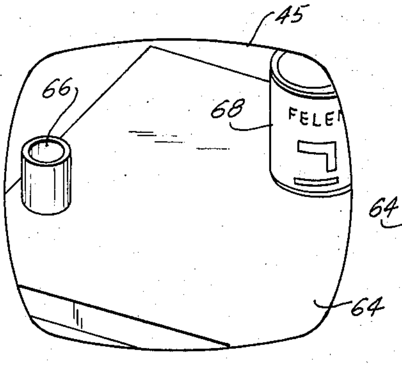
Figure 4:
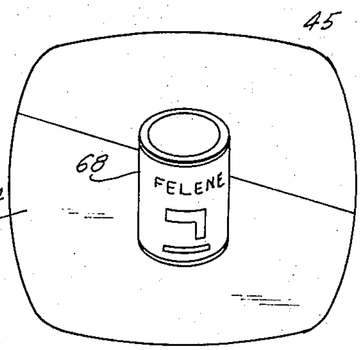

FIGS. 2, 3 and 4, together with FIG. 1, illustrate the method of the present invention. The projector 12 is operated in a conventional manner. Motion picture film 18 moves from one reel 22 to another 24, and passes through a projection station 20 at which it is illuminated by means of a lamp 14 and a lens system 16. The images from the film thus are delivered to the zoom lens 26, and thence to the film camera 40. The images thus are displayed on the control monitor 44 in rapid sequence.

When a scene is detected which requires editing, the projector is stopped so that the image within the screen outline 45 on the control monitor 44 is motionless. FIG. 2 shows an example of a normal scene which has been stopped or "still-framed" in the manner just described. The scene includes a table 64 upon which are resting a large object 68 and a smaller object 66 on the lower left-hand portion of the table 64. As an example, assume that it is desired to center the object 68, enlarge it so that the brand name of the object will be easier to see, and remove the smaller object 66 from the scene.

FIG. 3 illustrates the same scene after the first step has been taken, namely, to enlarge the scene. This has been done by operation of the zoom lens 26 to enlarge the images sent to the film camera.

FIG. 4 shows the same scene after the image has been moved down and to the left. The object 68 is centered in the screen outline 45, as desired, and the movement of the image to the left has completely removed the object 66 from the scene. The enlargement prior to shifting of the image on the screen prevents unwanted dark areas from appearing at the edges of the picture. The value of this editing method for use in commercials and artistic production is readily apparent.

When editing film in accordance with the present invention, the usual procedure is to run the film through the projector once, without recording anything on the VTR 48, while noticing the scenes and film portions requiring editing (enlarging and/or shifting). Then, if desired, a marking such as a foil patch or the equivalent is placed near the start of the portion needing editing so as to use circuitry and detector means on the projector as described in U.S. Pat. No. 3,610,815 to automatically stop the projector to still-frame the correct frame when the film is re-run through the projector. If preferred, the projector can be stopped manually at the desired location.

Next, the editing is done, in the manner described above. Then, the portion of film for which the editing is desired is run through the projector with the VTR 48 turned on. At the end of that film portion, the projector and VTR are stopped. The strip of video tape has the desired video signals on it representing the enlarged and/or shifted images.

Portions of the film which need no such editing are recorded on separate video tape segments during separate periods of operation of the projector and VTR. Then, the tape segments are spliced together and conventional electronic merging is used to form a complete video tape record of the film.

Figures 6, 7:
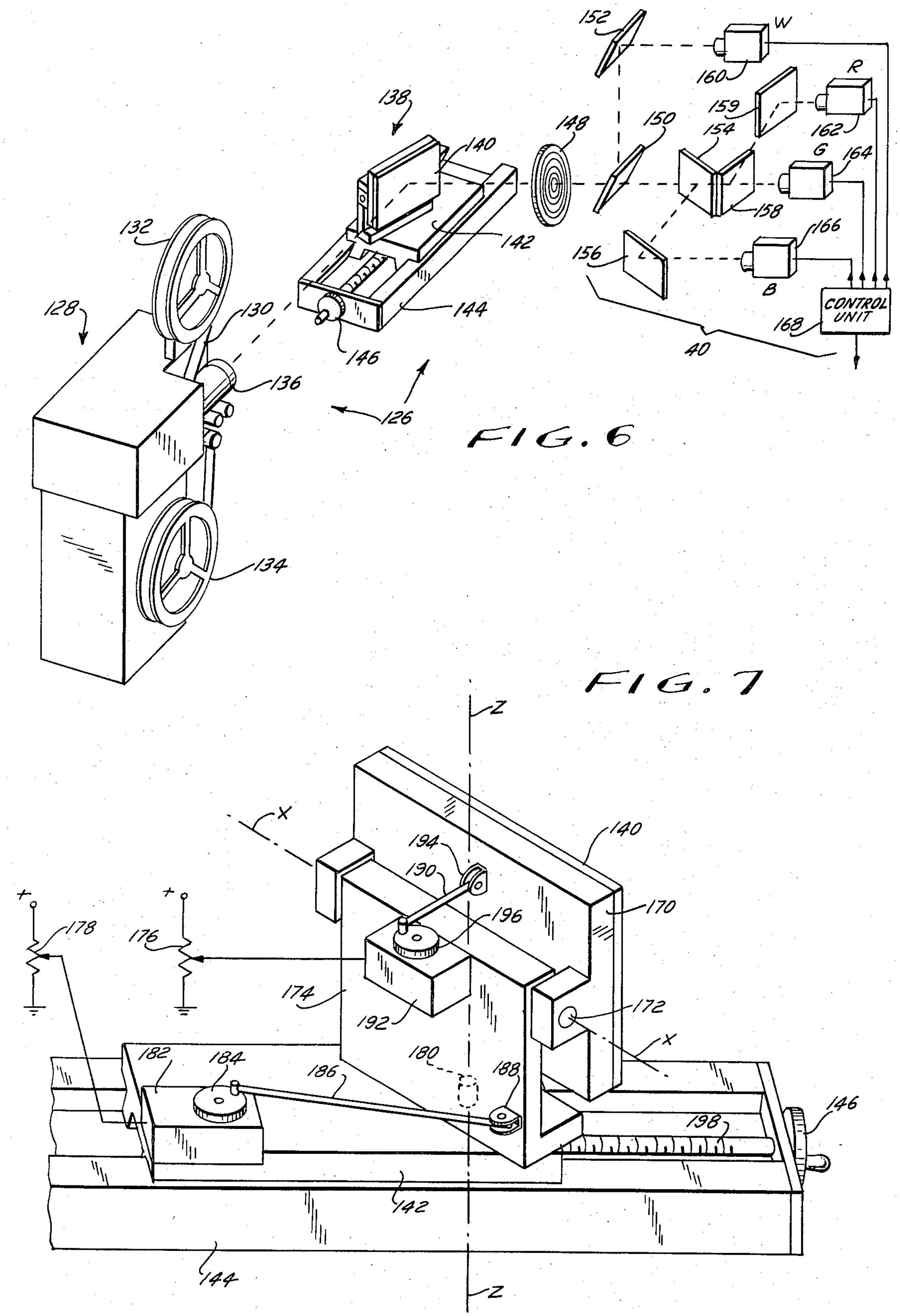
FIG. 6 is a perspective and partially schematic view of another embodiment of the present invention.
FIG. 7 is an enlarged perspective view of a portion of the system shown in FIG. 6.

If the film also needs color correction, a system as shown in FIGS. 1 or 6 can be used together with the automatic color correction equipment shown in U.S. Pat. No. 3,610,815. For example, suppose that a particular one-minute film has 10 scenes at the beginning which need color correction, and 3 scenes at the end, each of which needs color correction as well as enlargement and shifting. The first 10 scenes and others prior to the last three scenes are recorded first. The scene changes are marked on the film or located by counting means, etc. Then this part of the film is run through the projector with the VTR 44 disabled. The projector stops automatically at each scene change. The color correction is made for each scene while its first frame is displayed on the control monitor 44, and is stored in a storage device or memory. This step is repeated for each of the first ten scenes. Then the film is re-wound, the VTR 48 is turned on, and the color-corrected portion of the film strip is recorded on tape, with the corrections being read out of memory automatically under the control of a program, in the manner more fully described in U.S. Pat. No. 3,610,815.

Next, the remainder of the images on the film is transferred to the video tape. At the beginning, the proper enlargement and shifting adjustments are made. Then the color corrections are made and stored in memory as described above. Next, this portion of the film is re-run, with the VTR 48 turned on this time, to record the film portion with both editing and color corrections.

Finally, the two tape sections are spliced together and electronically merged as described above to form the complete tape record.

Tape slicing can be avoided by using the further embodiment of the invention shown in FIG. 8 and described below.

Referring again to FIG. 1, the drive system 28 for the zoom lens 26 includes four servo-motors 30, 32, 34 and 36. The motor 30 moves the zoom lens vertically, and the motor 34 moves the zoom lens horizontally. The motor 32 "zooms" the lens 26; i.e., motor 32 operates the zoom lens to change the amount of enlargement it provides, and the motor 36 moves the entire lens towards or away from the projection station 20 in order to re-focus the zoom lens after its zoom setting has been changed. Because of the foregoing functions, the motors 30, 32, 34 and 36 also are identified by the letters "V," "H," "Z," and "F," respectively.

The four motors 30, 32, 34 and 36 are controlled by four potentiometers 52, 54, 56 and 58 in the control unit 46, which control the voltages applied to the motors. Potentiometer 52 controls the horizontal drive motor 34, potentiometer 54 controls the vertical drive motor 30, potentiometer 56 controls the zoom motor 32, and potentiometer 58 controls the focus motor 36. The electrical system used for controlling the servomotors is described in greater detail in the co-pending U.S. patent application Ser. No. 235,634 filed on the same date as this application and entitled "Servo Control System." The disclosure of that patent application hereby is incorporated herein by reference.

It should be understood that, with the exception of the zoom lens 26, and its drive and control system, the system shown in FIG. 1 is conventional. For example, the projector 12 is a 35 millimeter projector such as the "PA 200" sold by General Precision Laboratories, Inc. Similarly, the "film camera" 40 can be of any of several commercially available devices, such as the "PE 240" film camera which is sold by the General Electric Company. Ordinarily, the film camera 40 includes the control unit 46. The encoder 42 is one such as that sold by Cohu Electronics Co., and the monitor 44 is a conventional television receiver. The video tape recorder 48, for example is the "VR 2000 B" recorder sold by Ampex Corporation. The mirror 38 preferably is a optical quality front-surfaced mirror.

Figure 5:
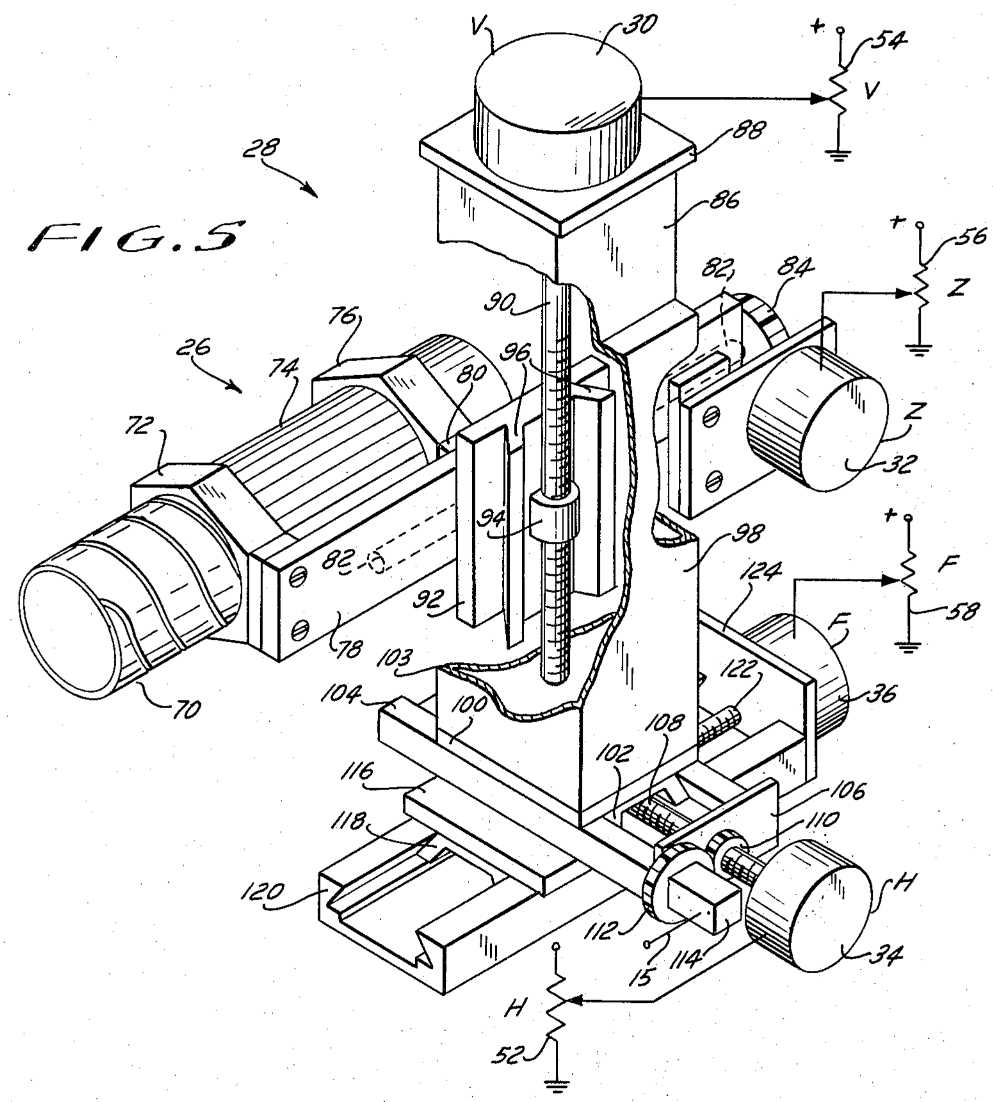
FIG. 5 is a perspective; partially broken-away and partially schematic representation of a portion of the system shown in FIG. 1.

FIG. 5 shows the zoom lens 26 and its drive system 28 in greater detail. The zoom lens 26 preferably is of a readily available commercial type such as the "Zoom-Maginon" zoom lens sold by Wetzlar of West Germany. The zoom lens system 26 includes a front barrel and mounting ring 72 with a splined rear portion 74. A mounting member 76 and rear lens portion slides to an fro on the splines 74 to change the enlargement produced by the zoom lens.

The front support 72 of the zoom lens 26 is secured to a horizontal guide member 78. The rear support 76 of the zoom lens is secured to a slide member 80 which slides in the guide 78 when it moves to and fro to change the zoom setting of the lens. This to and fro zoom movement is provided by means of the zoom motor 32 which drives a worm (not shown in FIG. 5) which rotates a worm gear 84 which is secured to a long threaded screw 82 which mates with an internally threaded portion of the slide member 80. Thus, rotation of the motor 32 drives the screw 82 to move the rear portion 76 of the zoom lens forward and back.

The zoom motor 32 is mounted on a plate 86 which is secured to a vertical support composed of two parts 86 and 98. The horizontal guide 78 to which the zoom lens 26 is attached is secured, in turn, to another slide member 92 which slides vertically in a guide member 103 which is mostly cut away in FIG. 5, so as to move the zoom lens upwardly or downwardly. This motion is provided by means of the servo-motor 30, which is mounted on a horizontal plate 88 secured to the top of the vertical support 86. The motor 30 drives another screw 90 which mates with an internally threaded portion 94 of the slide member 92. Angular slide projections 96 mate with similarly-shaped recesses in the vertical guide, which is shaped like the guide 120 shown in the lower portion of FIG. 5. Thus, when the motor 30 is operated, the slide 92 slides upwardly and downwardly in its guide, and carries with it the guide 78 and the zoom motor 32.

The support 98 is secured to another slide member 100 with a slide 102 sliding in a guide 104. The slide 102 is moved to the left and right in FIG. 5 by means of the horizontal servo-motor 34. The motor 34 drives another elongated screw 108 which mates with a similarly threaded portion on the slide 102. Additionally, a small spur gear 110 is secured to the drive screw 108. Gear 110 drives a larger spur gear 112 which drives a rotary potentiometer 114 which produces an output signal which is directly proportional to the degree of rotation of the shaft 108. As is explained more fully in the co-pending patent application entitled "Servo-Control System," which is identified more completely above, the signal from the potentiometer 114 is used for comparison purposes to ascertain when the serve motor has driven the screw 108 by the desired amount. Thus, the motor 34 moves the slide 102 and the structure 98, 86 to the left and right to shift the motion picture image horizontally.

Re-focusing of the zoom lens after each new zoom setting is performed by moving the entire structure shown in FIG. 5 within a guide structure 120 on a slide 116 sliding in the guide 120. The slide 116 is driven by means of a screw 122 which is rotated by the servo motor 36.

The slides are conventional, and are sold commercially under the trademark "Uni-Slide" by Vermex, Inc., Holcomb, New York.

Although they are not shown in FIG. 5 for the sake of clarity in the drawings, potentiometers identical to the rotary potentiometer 114 and its drive system are provided for the other servo-motors to give their positions of rotation relative to the desired position.

The system shown in FIG. 1 is preferred for film-to-tape conversions from 35 millimeter motion picture film. FIG. 6 shows the embodiment which is preferred for use with 16 millimeter motion picture film.

In the system shown in FIG. 6, a conventional 16 millimeter projector with reels 132 and 134 and film 130 and a conventional projection lens system 136 is used. The images from this projector are provided to a movable mirror 140 and then into the film camera 40.

The optical system of the unit 40 includes a field lens 148, a half-silvered mirror 150, dichroic mirrors 154 and 158, ordinary mirrors 152, 156 and 159, and video camera 160, 162, 164 and 166. Each dichroic mirror is a type of band pass filter which transmits light at all wavelengths except for those in the selected band. Light in the latter wavelengths is reflected by the mirror. Thus, the mirrors 154 and 156 reflect only blue light to the video camera 166, mirrors 158 and 159 reflect only red light to the video camera 162. The half-silvered mirror reflects a portion of the light at all wavelengths to the video camera 160. The camera 164 receives only green light through the two mirrors 154 and 158. This structure is known and is part of the usual film camera such as the General Electric unit identified above.

A control unit 168 is provided as a part of the film camera 40. An output lead 170 goes to the encoder 42, the control unit 46, the monitor 44 and the video tape recorder 48 as shown in FIG. 1. These components have not been reproduced in FIG. 6 in order to avoid redundancy in the drawings.

Within the control unit 168 is a system for electronically enlarging or reducing images. This system is operated in a known manner to either "underscan" the images it receives in order to enlarge them, or to "overscan" the image to reduce its size.

In accordance with the present invention, a movable mirror unit 138 is provided in order to move the image from the projector 128 both vertically and horizontally so as to enable horizontal and vertical movement, as well as enlargement of the image on the control monitor screen 45 in the manner described in connection with FIGS. 2 through 4. In all other respects, the system shown in FIG. 6 is and operates the same as that shown in FIG. 1.

FIG. 7 shows the details of the movable mirror arrangement 138. The mirror 140 is attached to a plate 170 which is pivotably mounted on a shaft 172 which is secured to a support member 174. The support member 174 is rotatably mounted on a pin 180 shown in dashed outline in FIG. 7. The pin is secured to a slide member 142 which slides in a guide 144 identical to the guides 120 and 104 shown in FIG. 5. Thus, the mirror 140 and its support 170 are movable about a vertical axis Z through the pin 180, and a horizontal axis X through the shaft 172.

The mirror is tilted and held in a desired position by means of a pair of servo-motors 182 and 192. The servo-motor 182 has an output drive wheel 184. One end of a crank arm 186 is connected to an eccentric pin on the wheel 184, and the other end is pivotably connected to a bracket 188 on the vertical support 174. Thus, as the servo-motor 182 rotates, the crank arrangement just described operates to rotate the mirror 140 and its support structure about the vertical axis Z.

The servo-motor 192 has the same construction as servo-motor 182, and its drives a wheel 196 and a crank arm 190 which is pivotably connected to a bracket 194 on the upper portion of the support 170. This causes the mirror 140 to tilt about the axis X so as to move the image up and down on the screen 45 of the control monitor 44. A potentiometer 176 is provided to control the servo-motor 192 in a conventional manner, and a potentiometer 178 is provided to control the servo-motor 182. Preferably the potentiometers are located at the control panel of the control unit 46 (see FIG. 1).

The embodiment shown in FIGS. 6 and 7 can be used in the same manner as that shown in FIGS. 1 and 5, except that the range of magnification possible with the system shown in FIGS. 6 and 7 is somewhat limited by the relatively smaller size of the film. Because of such practical considerations, the maximum magnification obtainable with the system shown in FIGS. 6 and 7 is around one and one-half to one. In contrast, the maximum magnification obtainable with the system shown in FIG. 1 is around four to one or better, without significant distortion or graininess of the resulting images. In the system in FIGS. 6 and 7, a hand crank 146 and a screw 198 are provided so as to permit manual horizontal movement of the mirror and its support structure. This is desirable not only to position the images reflected by the mirror, but also in order to move the whole movable mirror structure out of the way. In the latter instance, the mirror 38 (FIG. 1) can be moved into place instead of the mirror 140 so that the projector 12 shown in FIG. 1 can be put into use in the same "film chain" system including film camera 40 as that in which the projector 128 previously was operating. Thus, a film-to-tape transfer system is provided which will transfer and edit both 35 millimeter and 16 millimeter film.

As it was mentioned above, it is possible to prepare the video tape 50 as a continuous strip; i.e., without splicing sections together. The method used is similar to that described in U.S. Pat. No. 3,610,815. The disclosure of that patent hereby is incorporated herein by reference.

Figure 8:
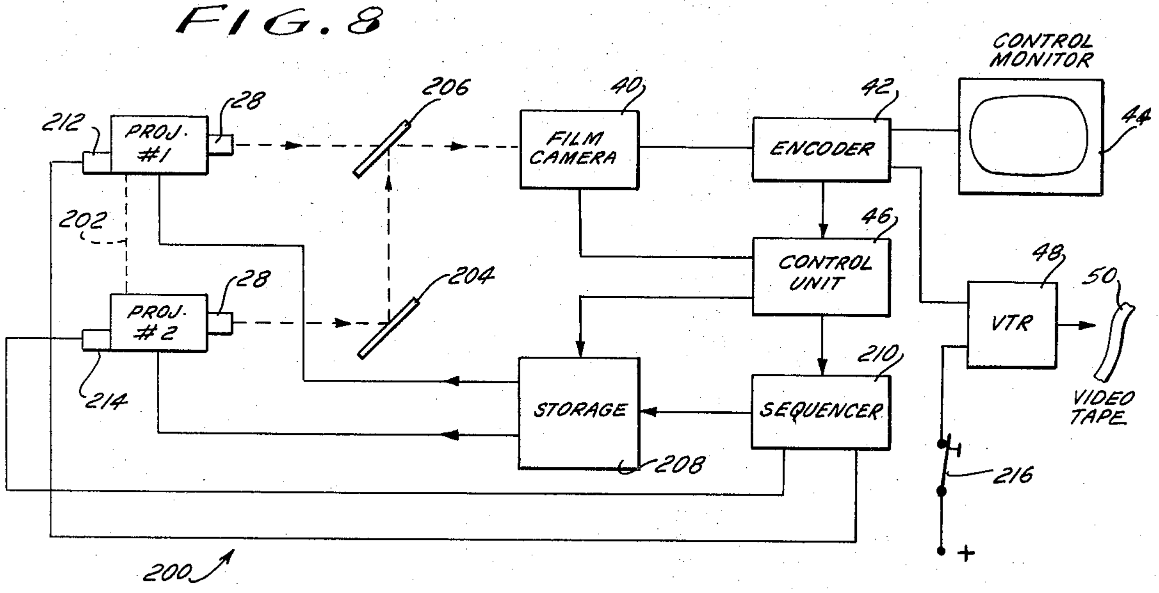

A system 200 for performing this method is shown in FIG. 8 of the drawings. Two projectors, No. 1 and No. 2 are used instead of one. Each projector uses a zoom lens and drive system 28 as shown in FIG. 1, and each projector projects images from an identical print of the same motion picture film. Means indicated schematically at 202 are provided for driving the two projectors in synchronism with one another.

There is a shutter (not shown) in each projector which quickly opens or closes to transmit or block images from being projected. One shutter opens when the other closes, so that images from one and only one projector are projected at a given time.

When the shutter of projector No. 1 is open and that of projector No. 2 is closed, the projector 206 projects its images through a beam-splitter 206 to the film camera 40. When he shutter of projector No. 2 is open and that of No. 1 is closed, projector No. 2 projects its images to a 45° mirror 204, then to the beam-splitter 206, and thence into the film camera 40. Thus, images are delivered to the unit 40 from the projectors alternatively.

The film camera 40 is connected to the encoder 42, control unit 46, monitor 44, and video tape recorder 48, as before. However, a storage unit 208, a sequencer 210, and marking detectors 212 and 214 are provided additionally.

The storage unit 208 can comprise a plurality of storage devices, such as the potentiometer units shown in the above-mentioned U.S. Pat. No. 3,610,815. Each storage device includes a plurality of potentiometers for storing the color component adjustment values for color connection of the images, as well as a potentiometer for each of the servo-motors 30, 32, 34 and 36.

In editing and color-correcting the film, each scene change and/or location at which enlargement and/or shifting is needed, a mark such as a foil patch is placed on the film. Alternatively, a frame counter can be used to count the frames from the beginning at which each scene change or editing location occurs. Each projector has a detector 212 or 214 to either detect the foil patch or detect the desired frame count. Depending on the mode of operation, the detectors operate to either stop the projectors at each mark location, or simply to send program signals to the sequencer 210.

In editing and color-correcting film, the system 200 is operated in a first mode in which the projectors No. 1 and No. 2 stop automatically when one of the detectors 212 and 214 detects a stopping location. During this mode, the switch 216 is open and the VTR is inoperative. The sequencer 210, whose operation is described more fully in U.S. Pat. No. 3,610,815, is a binary-code decimal counter which delivers an output signal to one of a plurality of rotary program switches, depending on the count of the counter. The count on the counter is advanced by every signal from one or the other of the detectors 212, 214. The number of one storage cell is put into one of the rotary switches for each editing and color correction location. The potentiometers of that storage cell are adjusted to the desired degree, thus storing their settings in memory. Then, the projectors are started again and run to the next stopping location, where the storing and programming processes are repeated.

Whenever there is a sudden change in enlargement or shifting of the images from what it was previously, a switch is operated in the memory cell to indicate a switch from the operation of one projector to the operation of the other. The position of each such switch determines the operation of the shutters in the two projectors.

When all of the color and editing adjustment signals have been made and stored, and the address of each storage cell has been put into the rotary switches, the film is re-wound on the projectors, the VTR 48 is turned on, and the projectors are started again. As each foil patch is sensed, the sequencer adds one count, and energizes a different memory cell. If the new memory cell has a different editing setting, the conditions of the shutters of the projectors will be reversed so as to bring the proper projector into a functioning condition.

Preferably, the foil patch is positioned a considerable number of frames ahead of the actual location of the desired changes. Then, when the sequencer switches to a new memory cell, the new signals for the servo-motors are read out immediately, while appropriate time delay circuitry delays the read-out of the shutter change and color correction signals. In this manner, the servo-motors will have time to change to the next settings before the projector actually comes into use.

The VTR records a continuous strip of tape which is edited and color-corrected; a tape strip ready to use and requiring no splicing.

The electronic enlargement of reduction capability of the embodiment shown in FIGS. 6 and 7 makes it possible to use only one projector in the system of FIG. 8 if shifting of the images is not required. This is true because the electronic enlargement setting can be changed fast enough to ensure proper editing of all frames in a given scene. However, if lateral or vertical shifting is needed, the time required is enough to dictate the use of the two-projector system described above.

Another system useful for producing continuous strips of edited tape is shown in FIG. 9. A single projector 300 with two zoom lens and drive systems 28 are used. A beam splitter 306 divides the light into two paths, 302 and 305. The light in path 302 is reflected by a mirror 308 past a shutter 312 in front of zoom system No. 2, and the light in path 305 meets a shutter 310 in front of the other zoom system No. 1.

The shutters 312 and 310 are operated in synchronism with one another by the sequencer 210 so that one shutter is open while the other is closed, thus delivering images to the film camera 40 through only one of the zoom systems. This permits one zoom system to be adjusted to a new setting while the other is in use, but requires only one projector and one film print to do it. The system shown in FIG. 9 otherwise is the same as the system shown in FIG. 8, and is amenable to the same modifications as those described above.

The above description of the invention is intended to be illustrative and not limiting. Various changes or modifications in the embodiments described may occur to those skilled in the art and these can be made without departing from the spirit or scope of the invention.

We claim:

1. In a device for editing images recorded on motion picture film, a motion picture projector, a film camera unit for receiving images from said projector and producing electrical image signals representative of the video components of images stored on said film, means for sequentially displaying corresponding images within a video receiver screen outline, means for enlarging the displayed images, means movable independently of said film camera unit for moving the images from said projector in two different directions prior to reaching said film camera unit so as to shift said displayed images in two different directions within said outline, and video recording means for recording on a video record medium electrical signals corresponding to the images displayed within said outline.

2. Apparatus as in claim 1 in which said enlarging means includes a zoom lens system as a projection lens, means for moving at least one element of said zoom lens system for enlarging and reducing said images, and for moving at least one other element of said zoom lens system to focus said lens system at each new setting.

3. Apparatus as in claim 1 including an encoder for encoding the signals from said film camera unit in a form for recording on video tape, said means for sequentially displaying images comprising a video receiver connected to said encoder, said recording means comprising a video tape recorder.

4. Apparatus as in claim 1 in which said shifting means includes reflector means for reflecting images from said projector into said film camera unit, means for mounting said reflector means to rotate about a substantially horizontal axis and substantially vertical axis, and means for rotating said reflector means about each of said axes.

5. Apparatus as in claim 4 in which said reflector means is a mirror, said rotating means includes two servo motors, each having a drive linkage connecting it to said reflector, and means for separately energizing said servo motors.

6. Apparatus as in claim 1 in which said shifting means includes means for moving the projection lens of said projector in a substantially horizontal direction and a substantially vertical direction.

7. Apparatus as in claim 6 in which said projector lens is a zoom lens, a servo-motor for adjusting the enlargement setting of said zoom lens, and another to move said zoom lens towards and away from the film in said projector.

8. A device for transferring motion picture film images to video tape, said device comprising, in combination, a motion picture projector, means for converting the motion picture film images into electrical video picture components signals, means for encoding said component signals and displaying said images on a video screen, means for enlarging said images on said screen in response to electric control signals, means for storing the control signals for a selected segment of film, means for detecting the beginning of each new segment of film and producing a change signal in response to each such detection, means for reading said control signals out of storage and delivering said control signals to said enlarging means, means responsive to said change signals for changing, in accordance with a program, the part of storage out of which control signals are read, for shifting said images on said screen in response to said control signals, another projector, means for operating said projectors in synchronization with one another, means for enabling only a selected one of said projectors to deliver images to said converting means at any given time, means for storing projector selection signals, means for reading out said control signals at a time far enough in advance of each new segment of film to enable one of the shifting and enlarging means associated with one of the projectors to change to a new setting, and means for recording the encoded and modified video signals on video tape.

9. A device as in claim 8 in which said shifting and enlarging means includes a zoom lens as a projection lens in each projector, and servo-motors for changing the zOom setting and focus of the lens, for moving the zoom lens vertically, and for moving the zoom lens horizontally, parallel to the plane of the film in the projector.

10. A method of editing film for video tape production, said method comprising the steps of displaying images from said film on a video receiver screen, enlarging said images and moving said images in at least one of the vertical and horizontal directions to remove a selected object from the image on said screen, and recording on a video record medium electrical video signals corresponding to the modified images.

11. A method as in claim 10 in which said images from said film are projected by a projector to a film camera, and including the steps of shifting said images prior to their reaching said film camera and thereby shifting said images on said film.

12. A method of enlarging and shifting images transferred from film to tape, said method comprising using a zoom lens as a projector lens in a projector, moving said lens to shift said images in at least one of the vertical and horizontal directions, and adjusting said zoom lens to enlarge said images, converting the images from said zoom lens into video component signals, displaying the encoded component signals on a video receiver screen, and recording the latter signals on video tape.

13. A method of transferring edited film images to video tape, said method comprising projecting duplicate film images along a pair of different paths, providing in each path separate means for shifting the images in that path, adjusting the shifting means of one path to a new setting while projecting images into a film chain from the other path, and vice-versa, and recording the projected images, converted into electrical video form, onto video tape.

14. A method as a claim 13 including storing adjustment information for said shifting means in a memory, and reading said information out of memory in response to changes from the utilization of one set of images to the utilization of the other set of images.

15. A method as in claim 14 including the step of storing signals to locate said changes and reading out the latter signals to change the utilization mode and read out the adjustment information.

16. A device for editing and transferring film images onto video tape, said device comprising means for projecting duplicate film images along different paths, means in each path for shifting the images therein, means for projecting images from only a selected one of said paths to a film chain and video tape recorder, means for changing the path selected, means for adjusting the shifting means in the path not selected while utilizing images from the selected path, said adjusting means including means for storing adjustment signals for each shifting means and delivering said signals during each adjustment time period.

17. A device as in claim 16 including a single film projector, beam splitter means for splitting the images into two paths, shutter means for blocking one path while leaving the other path clear, a multi-positional zoom lens in each path, and means for guiding images from both paths to said film chain.

18. A device as in claim 17 including a programable sequencer for operating said shutters, means for programming said sequencer in accordance with the location of editing changes on film, and means for reading out said adjustment signals under the control of said sequencer.

* * * * *